US011993091B2

(12) United States Patent
Grassman

(10) Patent No.: US 11,993,091 B2
(45) Date of Patent: May 28, 2024

(54) METHODS AND APPARATUS FOR HAND PRINTING DESIGNS AND PATTERNS

(71) Applicant: Darin A. Grassman, Boulder, CO (US)

(72) Inventor: Darin A. Grassman, Boulder, CO (US)

( * ) Notice: Subject to any disclaimer, the term of this patent is extended or adjusted under 35 U.S.C. 154(b) by 0 days.

(21) Appl. No.: 17/693,731

(22) Filed: Mar. 14, 2022

(65) Prior Publication Data

US 2022/0288961 A1 Sep. 15, 2022

Related U.S. Application Data

(60) Provisional application No. 63/160,256, filed on Mar. 12, 2021.

(51) Int. Cl.

| | |
|---|---|
| ***B41K 1/38*** | (2006.01) |
| ***B41K 1/22*** | (2006.01) |
| ***B41K 1/30*** | (2006.01) |
| ***B41K 1/56*** | (2006.01) |

(52) U.S. Cl.

CPC .................. *B41K 1/22* (2013.01); *B41K 1/30* (2013.01); *B41K 1/38* (2013.01); *B41K 1/56* (2013.01)

(58) Field of Classification Search

CPC ... B41K 1/04; B41K 1/22; B41K 1/30; B41K 1/56; B41K 3/62

See application file for complete search history.

(56) References Cited

FOREIGN PATENT DOCUMENTS

| | | | | |
|---|---|---|---|---|
| KR | 100780457 | * 11/2007 | .............. | B41K 1/06 |
| KR | 20080026330 | * 3/2008 | .............. | B41K 1/22 |

* cited by examiner

*Primary Examiner* — Christopher E Mahoney
*Assistant Examiner* — Marissa Ferguson-Samreth
(74) *Attorney, Agent, or Firm* — Macheledt Bales LLP; Jennifer L. Bales

(57) ABSTRACT

Elements for hand printing designs and patterns include cone pin blocks, flat pin blocks, and multisided sequence stamps. A cone pin block generally has a circular cross-section and is rolled in order to make symmetrical, circular or partial-circle designs. Flat pin blocks have a flat surface. The pin blocks have pins extending out of the cone surface or the flat surface. Flexible inking cord material is threaded between the pins in a chosen pattern. The inking material collects liquid ink by absorption or surface adhesion, which is transferred to a base by rolling or stamping. Multisided sequence stamps include left and right handles and multi-sided blocks disposed between the two handles. The blocks have relief designs on their peripheral side surfaces, either formed directly on the surface of the blocks or formed on rings that slide over the blocks. The blocks (and pattern rings if used) are many sided (e.g. hexagonal) with different embossed designs on different sides. Each block and/or pattern ring is individually rotatable relative to the other blocks/rings and may be added, removed, or exchanged with other blocks.

5 Claims, 8 Drawing Sheets

METHODS AND APPARATUS FOR HAND PRINTING DESIGNS AND PATTERNS

BACKGROUND OF THE INVENTION

U.S. Patent Application No. 63/160,256 filed 12 Mar. 2021, is incorporated herein by reference.

Field of the Invention

The present invention relates to apparatus and methods for hand printing.

SUMMARY OF THE INVENTION

Elements for hand printing designs and patterns include cone pin blocks, flat pin blocks, and multisided sequence stamps. A cone pin block generally has a circular cross-section and is rolled in order to make symmetrical, circular or partial-circle designs. The cone pin blocks have pins extending out of the cone surface. Flexible inking cord material is threaded between the pins in a chosen pattern. The inking material collects liquid ink by absorption or surface adhesion. Then the cone is rolled on the base surface to be printed and ink transfers from the inking cord material to the surface.

Flat pin blocks are similar to cone pin blocks, except with a flat surface. A flat pin block also has pins extending out from the surface and inking cord material is threaded through the pins in a chosen design.

Multisided sequence stamps include left and right handles and multisided blocks disposed between the two handles. The blocks have relief designs on their side surfaces, either formed directly on the surface of the blocks or formed on rings that slide over the blocks. The multisided sequence stamp is rolled like a rolling pin to first adhere ink to the relief designs and then to transfer ink to the base surface. Generally the multisided blocks snap together and the end blocks snap to the handles. The blocks may be added, be removed, or exchange places with each other.

The blocks (and pattern rings if used) are many sided (e.g. hexagonal) with different embossed designs on different sides. Each block and/or pattern ring is individually rotatable relative to the other blocks/rings, so the stamped design is chosen by selecting which side of each multisided block/ring is aligned to form the stamping surface. Ink is transferred to the relief designs (e.g. embossed) and from there is stamped onto the base surface.

The base surface is generally flat and might be fabric, paper, canvas, etc.

DETAILED DESCRIPTION OF THE INVENTION

TABLE 1

| Ref. No. | Element |
|---|---|
| 100 | Cone pin block |
| 102 | Pins |
| 104 | Elongated pins |
| 106 | Inking cord material |
| 108 | Cone pin block handle |
| 200 | Tapered pins |
| 300 | Non-tapered pins |
| 600 | Flat pin block |
| 602 | Pins |
| 606 | Inking cord material |
| 800 | Multisided sequence stamp |
| 802 | Left handle |
| 804 | Right handle |
| 806 | Multisided blocks |
| 810 | Raised designs |
| 812 | Pattern shanks |
| 814 | Pattern rings |
| 816 | Raised area for connecting |
| 818 | Depressed area for connecting |
| 820 | End caps |
| 822 | Gaskets |
| 824 | Axis of multisided sequence stamp |

Table 1 shows elements of the present invention along with associated reference numbers.

Figure 1A:
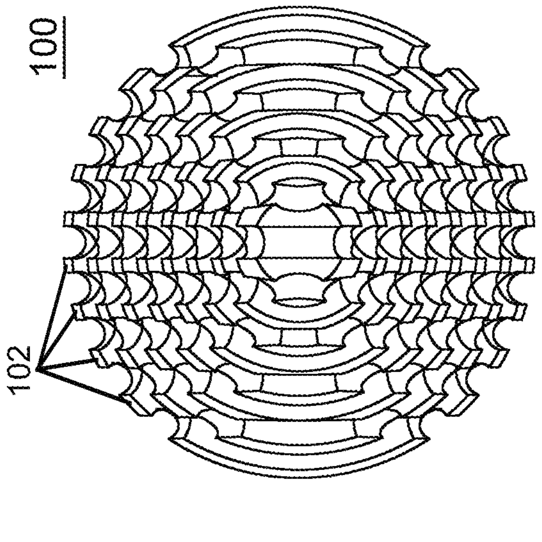
FIG. 1A is a top plan view of a cone pin block.
Figure 1B:
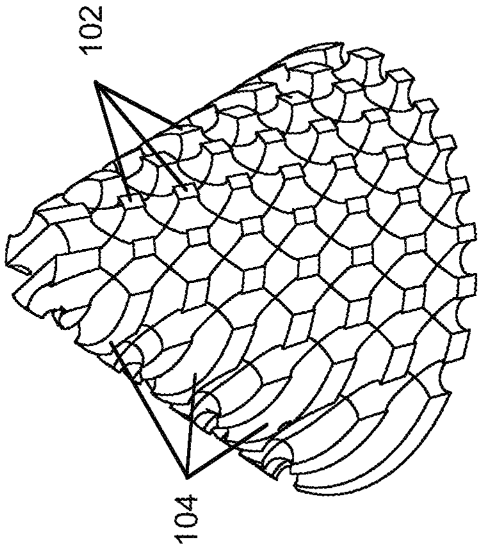
FIG. 1B is an isometric view of the cone pin block.
Figure 1C:
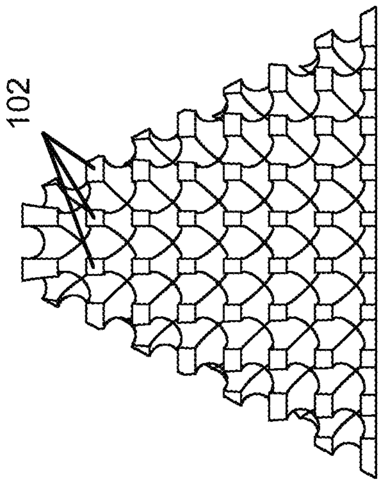
FIG. 1C is a side view of cone pin block.
Figure 1D:
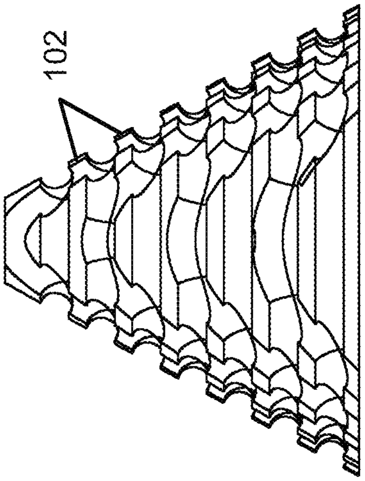
FIG. 1D is a side cutaway view of the cone pin block.
Figure 2:
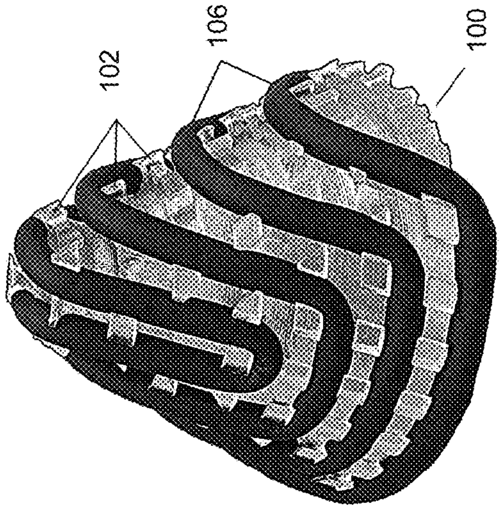
FIG. 2 is an isometric view of the cone pin block of FIGS. 1A-E with inking cord.
Figure 3:
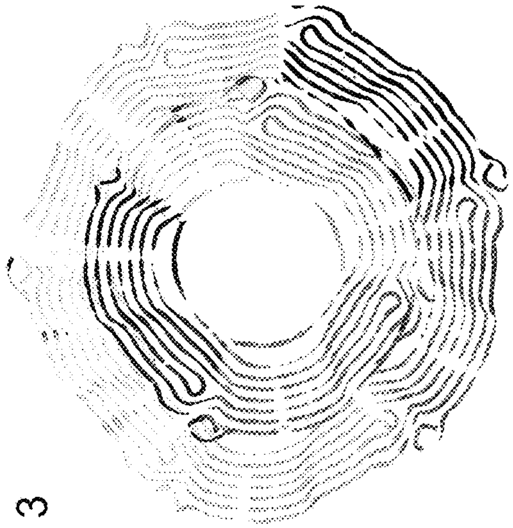
FIG. 3 is a plan view of an inked design formed with the cone pin block of FIGS. 1-2.
Figure 1E:
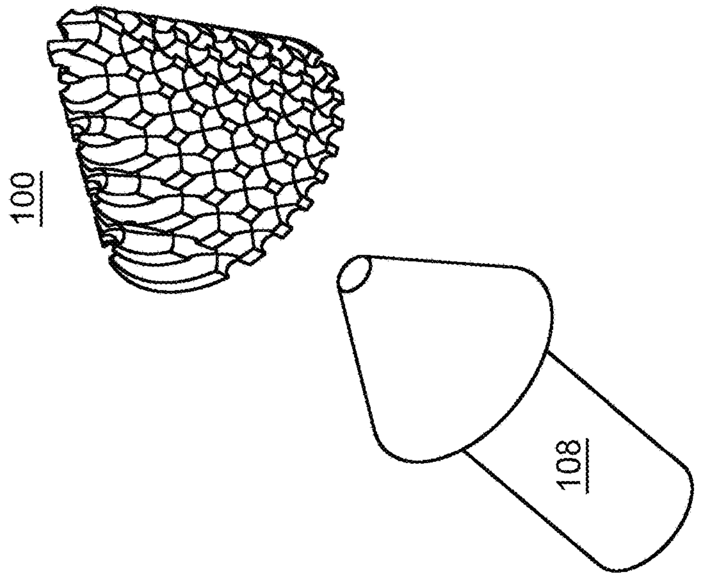
FIG. 1E is an isometric view of a cone pin block used in conjunction with a handle.

FIGS. 1A-1E and 2 illustrate cone pin blocks 100 according to the present invention. FIG. 3 is a design formed using a cone pin block 100. Cone pin blocks 100 are elements with a thinner cross section near the top and a wider cross section at the bottom. Terms such as “top” and “bottom” are used for convenience in describing embodiments, and not to limit their orientation, as are “left” and “right”.

Cone pin blocks 100 are generally formed of a hard material such as plastic, resin, ceramic, wood, or metal, and include pins 102, (alternatively pins 200, 300, 602 shown in later figures) extending outward. The purpose of pins 102 is to allow inking cord material 106 (and 606) to be threaded between pins 102 in desired designs, as shown in FIG. 2. In use, cone pin block 100 is rolled over a source of ink (not shown) so that ink adheres to cord 106. Then, cone pin block 100 is rolled onto a printing substrate to form a design as shown in FIG. 3. Since cone pin block 100 is wider at the top than the bottom, the design formed is a closed shape such as a ring.

Cone pin block 100 may be fabricated, for example, by 3D printing, carving, or adding individually crafted pins to a sculpted cone. One effective method using 3D printing is to embed digitally rendered tubes into the surface of a digital cone. The tubes are turned into negative space, such that when the cone pin block is fabricated, channels are effectively carved out of the cone where the tubes were embedded. First, horizontal tubes are embedded in parallel lines like latitude lines. Then, slanted vertical tubes are embedded running down the sides of the cone. The result is kind of a puffy waffle pattern, as shown in FIGS. 1A-E and 2. The pins might look like those in FIG. 4 if the tubes are embedded fairly deep. These pins 200 are especially useful in holding the inking cord in place, since they flare a bit at their inner and outer ends. The material might be a 3D printer filament such as hard plastic or resin).

While a circular cross-section works well for the cone pin block, other cross-sections may also be used (e.g. oval, pyramid, multisided etc.) Inking cord material 106 may be formed of neoprene, silicone, etc. The source of ink may be glass with a coating of ink on its top surface, an inking stamp pad, etc.

Figure 4:
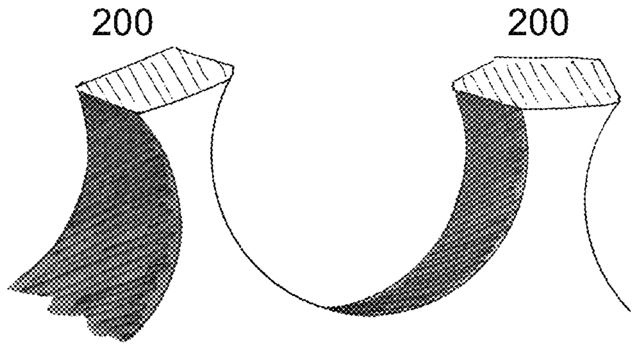
FIG. 4 is an isometric view of a first type of pin.
Figure 5:
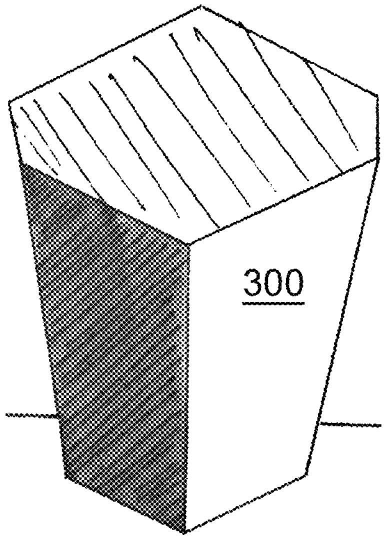
FIG. 5 is an isometric view of a second type of pin.
Figure 6C:
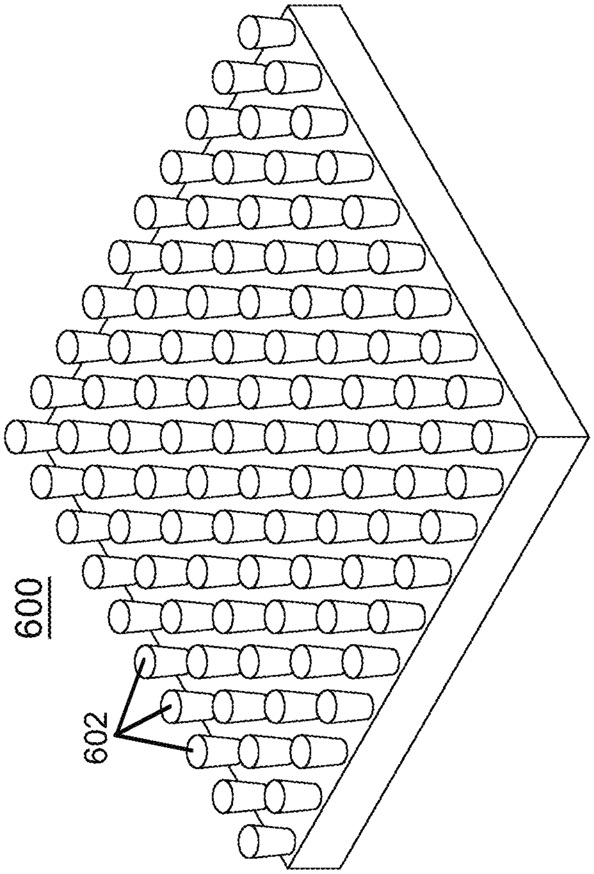
FIG. 6C is an isometric view of the flat pin block.
Figure 6A:
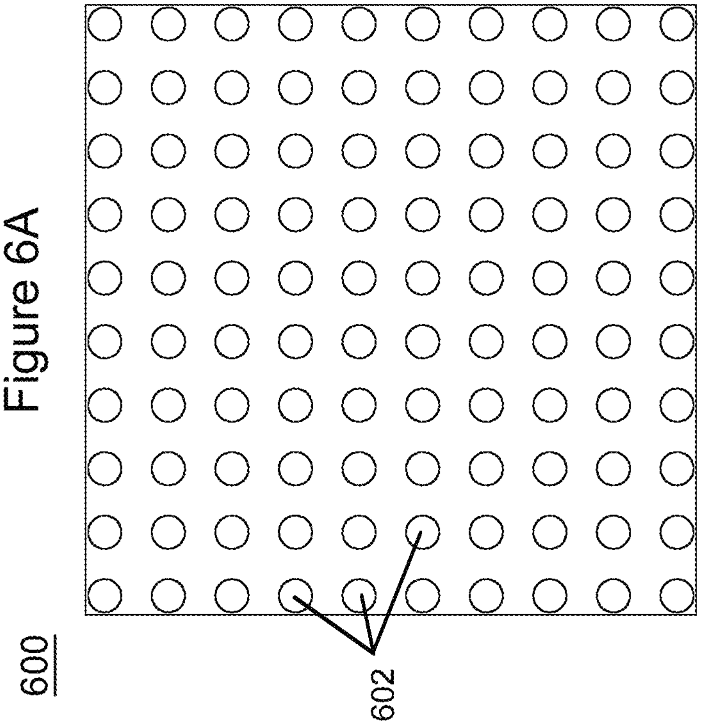
FIG. 6A is a top plan view of a flat pin block.
Figure 6B:
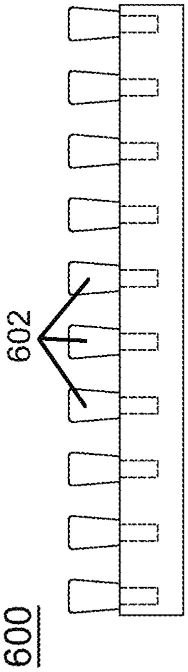
FIG. 6B is a side view of the flat pin block.

FIGS. 4 and 5 show examples of pins used on pin blocks. FIG. 4 is an isometric view of a first type of pin 200. As described above, pins 200 might be formed by subtracting tube shapes from the digital cone, resulting in regular or irregular pillars like canyons formed by erosion. The cord then sits in the curved places formed by the pins. Pins 200 are formed with flared ends in order to better hold inking cord material 106. FIG. 5 is an isometric view of a second type of pin 300, having a multisided cross section. Pins may also have round or oval cross sections.

FIGS. 6-9 show illustrate a flat pin block 600 according to the present invention. FIG. 6A is a top plan view of flat pin block 600, FIG. 6B is a side view of flat pin block 600, and FIG. 6C is an isometric view of flat pin block 600.

Figure 8A:
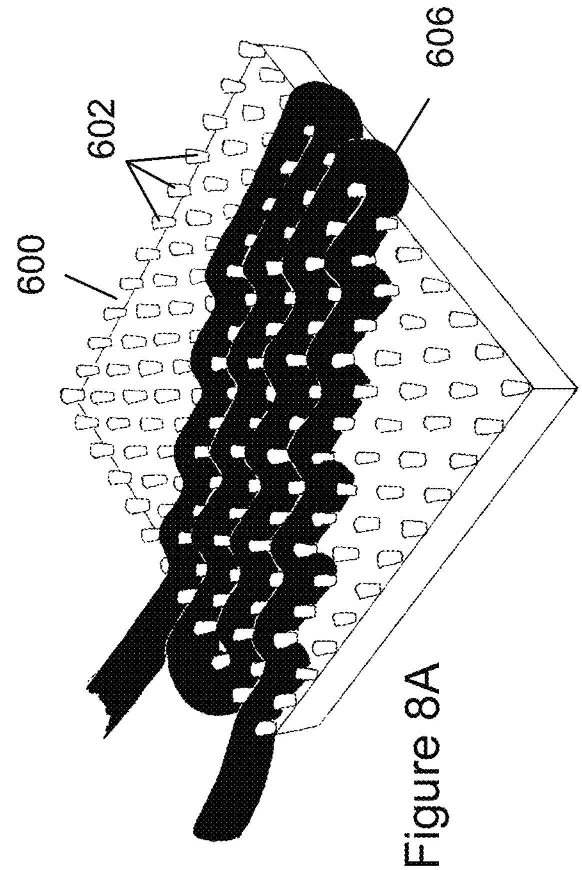
FIG. 8A is an isometric view of the flat pin block of FIGS. 6A-C with inking material threaded between pins.
Figure 8B:
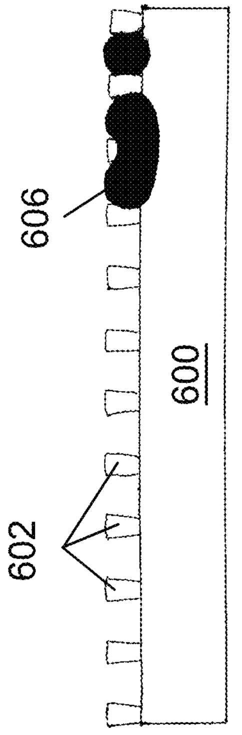
FIG. 8B is a side view of the flat pin block with inking material threaded between pins.
Figure 7:
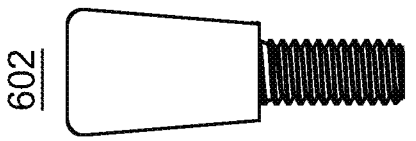
FIG. 7 is a side view of a pin from the flat pin block of FIGS. 6A-C.
Figure 9B:
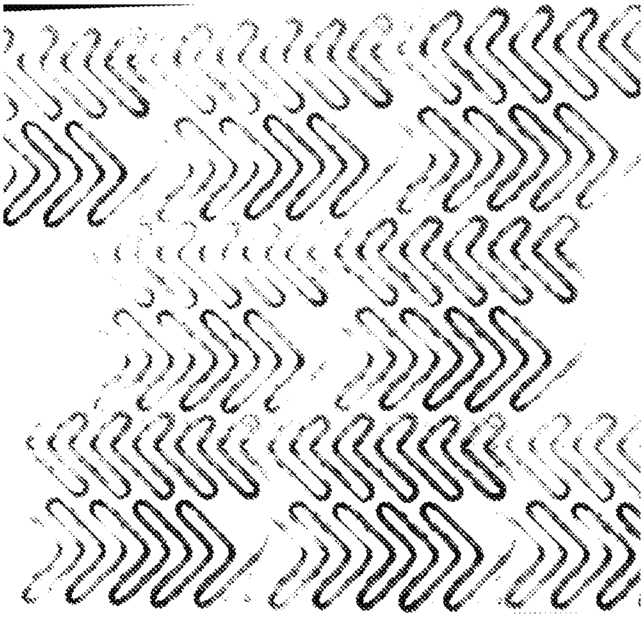
FIG. 9B is a plan view of an inked design formed with the flat pin block.
Figure 9A:
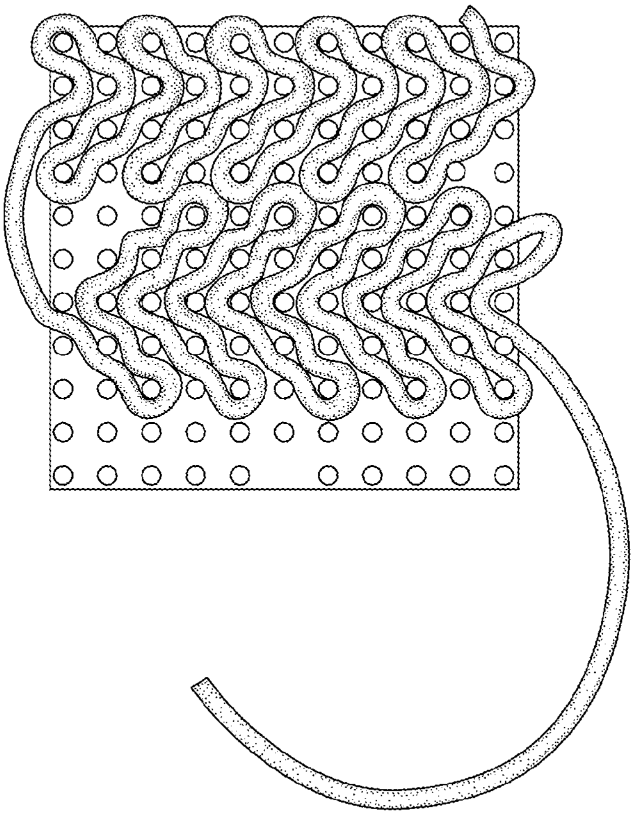
FIG. 9A is a top view of the flat pin block with inking material threaded between pins.

FIG. 7 is a side view of an embodiment of pin 602. FIG. 8 is an isometric view of the flat pin block 100 with inking cord material 606 threaded between pins 602. FIG. 9 is a side view of flat pin block 600 with inking cord 606 threaded between pins 602.

Flat pin blocks 600 offer a way to stamp patterns onto base material (primarily flat, such as paper, canvas, or cloth) by hand; both repeating patterns and non-repeating unique shapes. Pin blocks 600 include pins 602 extending upward from their base surface. Pins 600 may be configured like pins 200 or pins 300, or may have a circular cross section with wider ends than base, as shown in FIGS. 6-9. Pin blocks 600 provide a way to create nearly infinite patterns on the same block by re-arranging how the inking cord material is threaded among the pins. Flat pin blocks 600 may be fabricated in any of the ways described above for cone pin blocks, including 3D printing method with negative space embedded tubes in the digital block surface. The example pin 602 in FIG. 7 is screwed onto a flat surface of a substrate board to form the flat pin block. 3D printing or other methods may also be used.

Both cone pin blocks 100 and flat pin blocks 600 include a system of pins arranged generally in a grid pattern on a flat block or cone-shaped block. A pin grid on a curved surface (such as cone pin bock 100 block) creates a circular or curved print. Each pin may wider at the end than at the base, allowing for a soft, flexible, washable inking cord material 106, 606 (such as neoprene foam or soft silicone) to run through the channels created by the rows of pins. The inking cord is thus held in place in the channel by the wide tops. The cord can be wound through the pins in any number of orientations, creating geometric lines and curvy or straight shapes. The number of patterns that each tool can create is only limited by the number of pins in the grid. insert example and stamp One benefit to the flat pin block is that the inking cord material can extend beyond the pin block, causing patterns with swooping curves having an extent larger than the extent of the flat surface.

After the cord is wound through the pin grid, it is inked for printing and can be pressed to the printing base to transfer the ink.

FIGS. 10-14 illustrate multisided sequence stamps 800 according to the present invention. FIG. 10A is an side cutaway view of a multisided sequence stamp 800, and FIG. 10B is an isometric view. Multisided blocks 806 snap together and are replaceable and can be rearranged in any order. Here, each multisided block has a raised area on one and a depressed area on the other end. The raised area on one block 806 snaps into the depressed area of an adjacent block. The blocks on the ends then attached to the handles 802, 804. For example, the depressed areas and the raised areas may form hexagons. Shapes with sides have the advantage that the blocks will not slip with respect to each other once they are attached.

While two multisided blocks are shown here for simplicity, commonly 3 or more would be used. A common number of multisided blocks used in a multisided sequence stamps is around six.

Figures 10A, 10B:
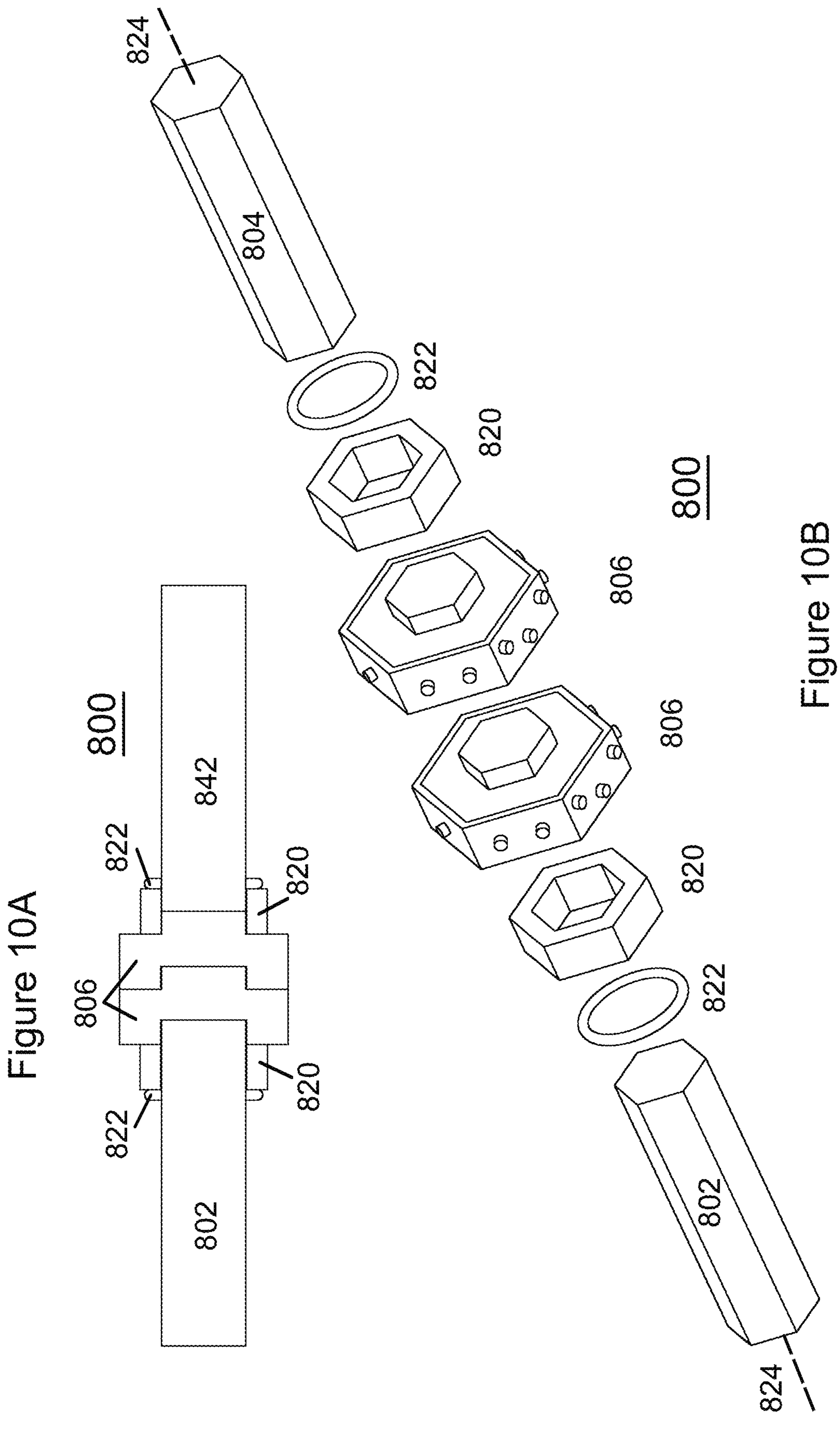
FIG. 10A is a side cutaway view of a multisided sequence stamp.
FIG. 10B is an isometric view of the multisided sequence stamp.

In the embodiment of FIGS. 10A and 10B, left handle 802 and right handle 804 are interchangeable. In this example they are hex shaped rods. Left handle 802 thus can snap into the depressed hexagonal area of the leftmost block. In this example an end cap slides partway onto the left handle and is held in place with a gasket 822, for greater stability. Right handle 804 in turn snaps into another end cap 820, as does the raised area of the right most multisided block. Another gasket 822 holds the end cap 820 in place. The gaskets may be rubber and slidable to the desired location, or they may be fixed. Other stabilizing elements may be used.

As an alternative, one or both handles may have their endcaps integrally formed. The left hand endcap is not necessary in either example.

Figure 14:
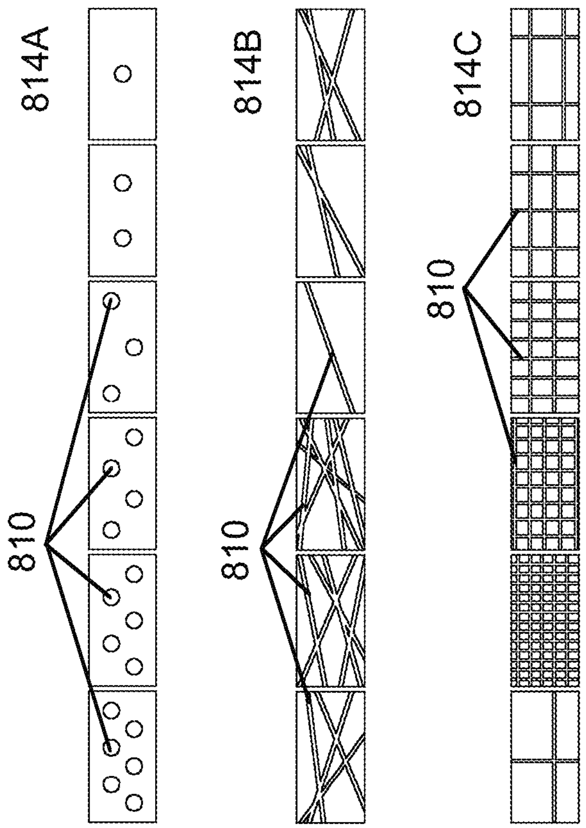
FIG. 14 shows examples of pattern ring designs.
Figure 12:
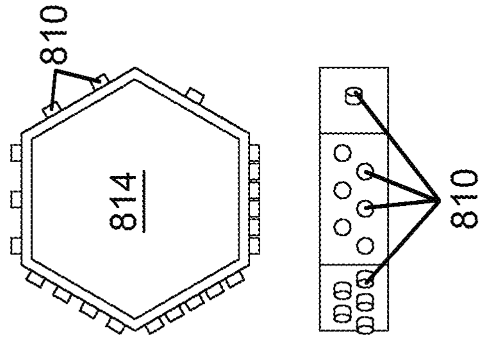
FIG. 12 is a top view and a side view of a pattern ring used in the multisided sequence stamp of FIGS. 10A-B.
Figure 11:
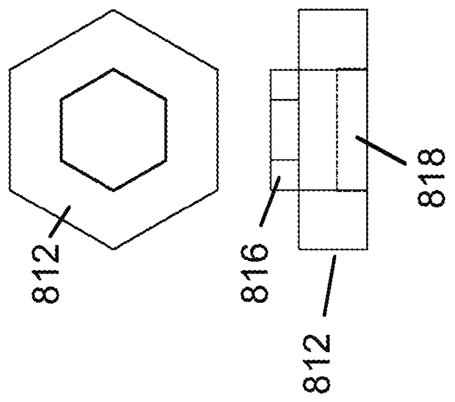
FIG. 11 is a top view and a side view of a pattern shank used in the multisided sequence stamp of FIGS. 10A-B.
Figure 13:
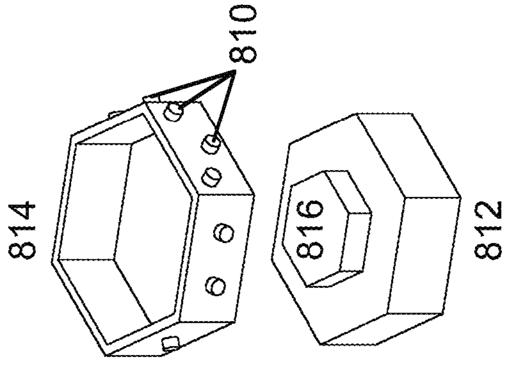
FIG. 13 is an isometric view of a multisided block used in the multisided sequence stamp of FIGS. 10A-B.

FIGS. 11-13 show examples of multisided blocks 806 used in multisided sequence stamp 800. FIG. 14 shows examples of raised designs 810 which might be formed on multisided blocks 806. Multisided sequence stamp 800 is elongated along an axis 824. Multisided blocks 806 have multiple (e.g. 6) sides on their periphery parallel to axis 824, with designs for inking.

In the example of FIGS. 11-13, multisided blocks 806 are formed of pattern rings 814 which slide onto pattern shanks 812. The raised designs 810 are formed on design rings 814. The advantage to this arrangement is that only a limited number of patterns shanks is needed as the pattern rings may be exchanged. In some embodiments, pattern shanks 812 are generally a hard, rigid material such as wood, metal or plastic, and may be machined or 3D printed. Pattern rings 814 have some flex and might be formed of thermoplastic polyurethane (TPU) via 3D printing or injection molding. As an alternative, multisided blocks 806 may be formed integrally, with the raised designs 810 formed directly on their sides.

The multisided sequence stamps 800 offer another way to print patterns onto a base material (primarily flat, such as paper, canvas, or cloth) by hand; both repeating patterns and non-repeating unique shapes. The tool provides a way to create infinite patterns on the same multisided sequence stamp 800 by re-arranging the multisided blocks 806 between handles 802, 804.

Multisided sequence stamp 800 is made up of three kinds of parts: 1) left handle 802 and right handle 804, similar to handlebars on a bicycle. In some embodiments the handles were made hollow for ease of fabrication.

2) Multisided blocks 808 are, e.g. hexagonal blocks that have both a raised area 816 and depressed area 818 on either side and snap together to form a multisided core. Multisided blocks 808 snap to a handle 802, 804, via end caps 820. Blocks 808 may have relief designs 806 formed on their outer surfaces, or may be smooth to allow multisided rings 814 to slide over them (see FIGS. 11-13).

3) Pattern rings 814 are (e.g.) hexagonal bands with a textured pattern 810 printed on the outer sides. One pattern ring 814 slides onto one pattern shank 812 and is interchangeable with any other pattern ring 814 (either forming the same pattern or forming a different pattern). Rings 814 are slipped onto the shanks 812 before handles 802, 804 are added.

After the pieces have been snapped together and assembled, the relief designs 810 can be inked, by pressing the chosen side in ink or dabbing ink on the chosen side and pressed to a substrate. Multisided blocks 806 may be rotated with respect to each other, allowing for more permutations and combinations. More or fewer multisided blocks may be snapped together between handles 802, 804.

FIG. 14 shows examples of pattern rings 814A-D (laid out flat for visisbility) having raised designs 810. Raised designs 810 may have many other shapes and patterns, and may be the reverse of what is shown in the figures (e.g. dots as depressions rather than extensions).

While the exemplary preferred embodiments of the present invention are described herein with particularity, those skilled in the art will appreciate various changes, additions, and applications other than those specifically mentioned, which are within the spirit of this invention.

What is claimed is:

1. A flat pin printing block comprising:

a substrate having a flat surface;

pins having inner ends attached to the flat surface and having outer ends extending outward from the flat surface; and inking cord configured to wind between and among the pins;

wherein the inking cord is configured to be coated with ink and to print onto a substrate when the flat surface is pressed onto the substrate in a manner to cause the inking cord to contact the substrate.

2. The flat pin printing block of claim 1 wherein the pins are formed narrower at the inner ends and wider at the outer ends.

3. The flat pin printing block of claim 1 wherein the pins are formed narrower in a portion between the inner ends and the outer ends than they are at either the inner ends or the outer ends.

4. The flat pin printing block of claim 3 wherein the core and the pins are formed integrally by 3D printing.

5. The flat pin printing block of claim 1 configured to allow the inking cord to extend beyond the flat surface in directions parallel to the flat surface such that designs formed by pressing the inking cord coated with ink onto the substrate have a greater extent than the flat surface has.

* * * * *